United States Patent
Chew et al.

(10) Patent No.: US 7,149,863 B1
(45) Date of Patent: Dec. 12, 2006

(54) SYSTEM AND METHOD OF DESCRIPTIVELY SPECIFYING MEMORY PLACEMENT IN A COMPUTER SYSTEM

(75) Inventors: Jonathan J. Chew, San Francisco, CA (US); Bart Smaalders, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 474 days.

(21) Appl. No.: 10/682,685

(22) Filed: Oct. 8, 2003

(51) Int. Cl.
*G06F 12/00* (2006.01)
(52) U.S. Cl. .................. 711/170; 711/141; 719/328
(58) Field of Classification Search .................. None
See application file for complete search history.

(56) References Cited

U.S. PATENT DOCUMENTS 5,953,741 A * 9/1999 Evoy et al. ................ 711/132

6,292,874 B1 * 9/2001 Barnett ........................ 711/153

* cited by examiner

*Primary Examiner*—Brian R. Peugh
(74) *Attorney, Agent, or Firm*—Osha Liang LLP

(57) ABSTRACT

In a computer system, a descriptive memory allocation system is described having a memory policy allocation module for setting memory allocation policies by an operating system in response to descriptive resource use requirements provided by an application requesting access to a specified address range in memory. The descriptive memory allocation system includes a descriptive resource allocator that uses descriptive memory use advice provided by an application to decide how to allocate memory to the application. The descriptive resource allocator includes memory allocation policies that may be set by the operating system after the operating system has determined the appropriate allocation scheme to implement based on an allocation advice provided by a requesting after the application. The application in providing its descriptive memory use information does not specify a specific allocation policy the operating system should use to allocate memory to it.

16 Claims, 7 Drawing Sheets

SYSTEM AND METHOD OF DESCRIPTIVELY SPECIFYING MEMORY PLACEMENT IN A COMPUTER SYSTEM

FIELD OF THE INVENTION

The present claimed invention relates generally to the field of resource allocation in a computer system. More particularly, embodiments of the claimed invention relate to a descriptive method for specifying memory placement in a computer system.

BACKGROUND ART

Multiprocessor computers by definition contain multiple processors that can execute multiple parts of a computer program and/or multiple distinct programs simultaneously, in a manner known as parallel computing. In general, multiprocessor computers execute multithreaded-programs and/or single-threaded programs faster than conventional single processor computers, such as personal computers (PCs), that must execute programs sequentially. The actual performance advantage is a function of a number of factors, including the degree to which parts of a multi-threaded program and/or multiple distinct programs can be executed in parallel and the architecture of the particular multiprocessor computer at hand.

Multiprocessor computers may be classified by how they share information among the processors and also whether they share memory or not. Shared-memory multiprocessor computers offer a common physical memory address space that all processors can access. Multiple processes and/or multiple threads within the same process can communicate through shared variables in memory that allow them to read or write to the same memory location in the computer. Message passing multiprocessor computers, in contrast, have a separate memory space for each processor or set of processors, requiring processes in such a system to communicate through explicit messages to each other.

Shared-memory multiprocessor computers may further be classified by whether all physical memory can be accessed by all CPUs in the same amount of time. The two classes of shared memory multiprocessors based on memory access time are called Uniform Memory Access (UMA) and Non-Uniform Memory Access (NUMA) machines. NUMA machines are often organized into multiple nodes with one or more processors per node. Although all of the memory is globally accessible in a NUMA machine, a processor can access memory in its local node faster than memory in a remote node and depending on the architecture, multiple levels of nodes may exist.

In UMA machines, all of the processors can access all of the physical memory in the same amount of time. Both forms of memory organization typically use high-speed cache memory in conjunction with main memory to reduce execution time.

FIG. 1 shows a computer system 100 which includes nodes 120 and 130, operating system 107, application 105, CPUs 122–123 and 132–133, I/O devices 150A–150B and memories 121 and 131. The illustrated operating system 107 is a UNIX-based operating system. The operating system 107 is a program stored in memory on one or more nodes 120 and 130. The computer system 100 shown in FIG. 1 is a UNIX-based machine that permits nodes to communicate with any other node.

In the computer system 100 shown in FIG. 1, the operating system 107 usually allocates memory for an application such that it will perform well without much or any knowledge of the application itself. This is straightforward on UMA machines where the latency to all memory is the same from the CPUs 122–132 in the system 100. With UMA machines, the operating system 107 can indiscriminately allocate memory from almost anywhere and provide the same performance for the application 105. In contrast, this becomes more difficult on machines with asymmetric memory hierarchies such as NUMA where the latency isn't the same to all memory from all CPUs 122–133 in the system. On such systems, the operating system may need to allocate the memory near the CPUs 122–133 that application 105 runs on for optimal performance.

Without knowing more about the application itself, the operating system in FIG. 1 becomes an unintelligent conduit to memory 121 and 131 and can only do so much. On NUMA systems, the operating system can try to always allocate memory near the application, but this may not be the right thing to do all the time for all applications. For example, this might only be good to do for a portion of the application's address space or the needs of the application may change over time. Thus, there are applications that could achieve more performance through better memory placement than what the operating system provides by default. Given this, the problem is coming up with the best way to inform the operating system of how the memory should be allocated to get the best performance in the application. Furthermore, placement optimization requires restricting locations of the processes.

In a prior art memory allocation system, such as system 100, an inflexible prescriptive memory allocation scheme is the way an application can effect how the operating system should allocate memory for the application. In such a memory allocation scheme, the application has to know memory characteristics of the particular computer system that the application is running on and the semantics of the memory allocation policies implemented by the operating system in order to optimally allocate the prescribed memory. This inflexible method of allocating memory restricts the ability of certain computer systems to run certain applications. And in the event that these computer systems run out of memory, the prescribed memory range is unavailable or the prescription may not apply to the computer that the application is currently running on rendering ineffective the applications memory prescriptive capabilities. The prescriptive method of allocating memory to applications may also result in a degradation of the overall performance of the underlying computer system.

Because of these issues and the relative costs of the various solutions approaches of the prior art, a simple solution which is viable to implement with minimal expense and which provides minimal complexity and maximum usability to the end user is needed. This solution should provide a platform independent scheme of allocating memory based on how an application uses memory rather than a rigid prescribed memory allocation policy.

SUMMARY OF INVENTION

Accordingly, there is provided a multi-processor computer system having a descriptive Application Programming Interface (API) that allows the underlying operating system to optimally allocate resources for the applications on whatever computer the application is running on. For example, on a NUMA machine, the operating system may use this descriptive advice to set the memory allocation policy rather than having the application programs running in the computer system explicitly set these policies as is prevalent in the conventional art.

What is described herein is an approach of dynamically allocating resources, such as memory, in a multi-processor computer system environment based on a described memory access behavior of an application program in the computer system. An underlying computer operating system allocates resources based on how a particular application intends to use memory, etc., in the computer system.

According to an example of the invention, a system interface to the operating system allows an application to describe how it will use memory in a computer system and allows the underlying operating system to decide how best to allocate resources on a given computer system in a platform independent manner. With the descriptive information provided by the application, the operating system is able to optimally allocate resources for the application. In Non Uniform Memory Access machines, this results in the operating system choosing an appropriate memory allocation policy for the specified memory given the application's described behavior. This, in contrast to having the application specify the memory allocation policy directly as exists in the prior art.

This frees applications from having to know details of how the underlying computer system hardware or operating system works. It also frees applications from having to inform the operating system what exactly to do and allows the operating system to interpret an application's memory access characteristics to determine how to optimally allocate memory to the application in a computer platform independent manner. In one embodiment of the present invention, the descriptive information provided by an application may be interpreted by the operating system and applied to any computer or reapplied if the underlying computer hardware changes.

Embodiments of the present invention include an application interface that enables a requesting application to descriptively provide its memory access advice to the underlying computer system operating system and a separate module for the operating system to determine the optimal memory allocation policy to allocate memory to the application. The memory access advice provided by an application includes advice to indicate that the next thread to touch a specified memory range will access that particular memory range heavily. The memory access advice further includes advice to indicate that many threads will access a specified memory range heavily.

Embodiments of the present invention include application request interpretation logic that interprets the descriptive request from the application and determines the appropriate allocation policy. On a NUMA machine, the invention relies on the application request interpretation logic to interpret the descriptive memory use information provided by the application. The invention then selects the memory allocation policy for the specified memory range.

Embodiments of the invention further include a policy module that provides a variety of memory allocation policies to optimize performance of an application based on the memory access advice given by it. The policy module includes a latency aware module for generating memory allocation policies for memory access to NUMA machines and a cache conflict avoidance module for generating a memory allocation policy for memory access to non-NUMA machines.

Embodiments of the latency aware module include a "next-touch" memory allocation policy for specifically allocating a specified range of memory to a requesting application from (or near) the node where the next reference of the memory is made. This policy is used by the operating system when the application advises that the next thread to touch the specified address range will access that particular range most heavily, so it should try to allocate the memory and other resources for this range near the thread accordingly.

Embodiments of the latency aware module also include "random" memory allocation policy that implements a random memory allocation when the application describes its behavior as having many threads or processes access the given memory range heavily. This policy has the operating system allocate the specified range of memory randomly from all the nodes on a NUMA machine.

Embodiments of the latency aware module further include default memory allocation policy specified by the operating system in which memory allocation for a specified address range is implemented based on a default manner of the underlying computer system.

Embodiments of the cache conflict avoidance module include cache avoidance policy for deciding whether a cache avoidance policy should be set for a given range of memory.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended Claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

The embodiments of the invention are directed to a system, an architecture, subsystem and method to process data in a multi-processor computer system. In accordance with an aspect of the invention, a system for dynamically allocating specified memory address range based on descriptive memory access information provided by an application to an underlying computer operating system in the multi-processor environment.

Figure 1:
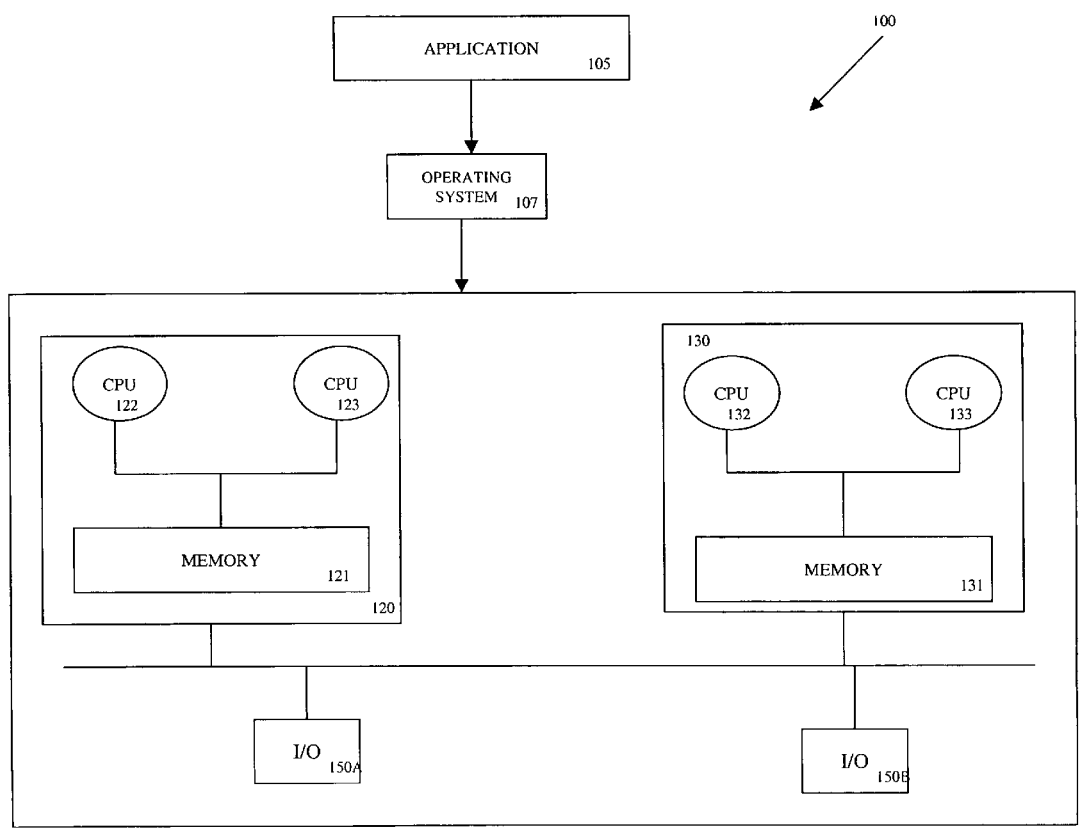
FIG. 1 is a block diagram of a prior art multi-processor computer system.
Figure 2:
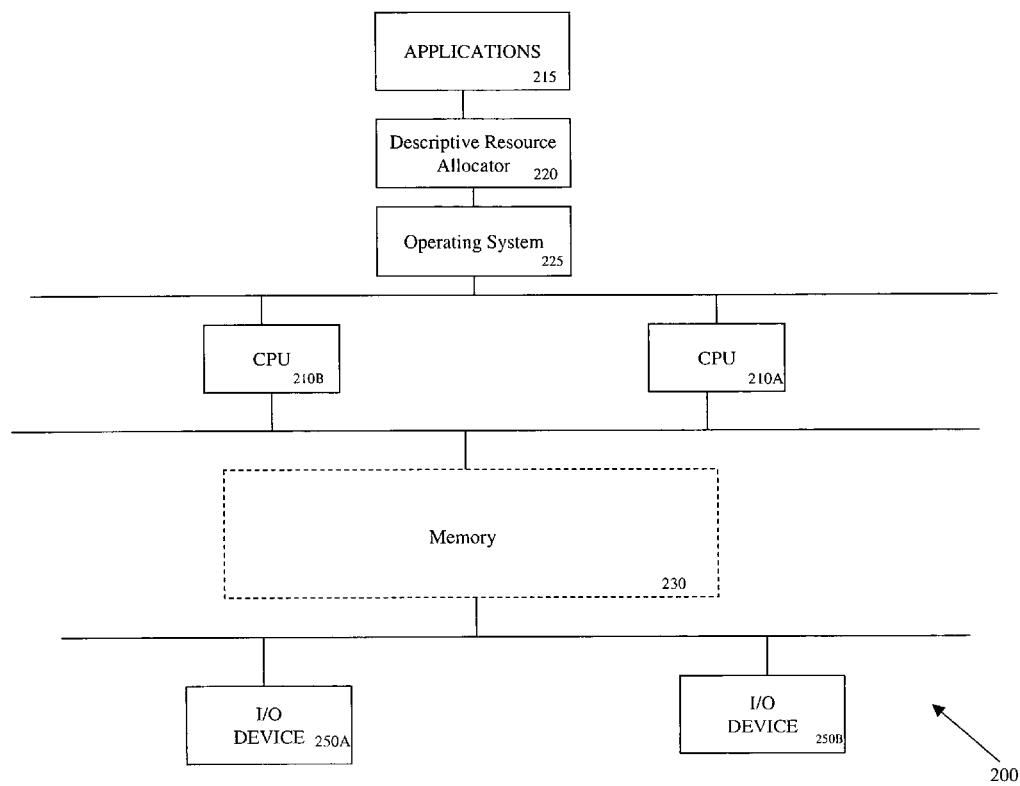
FIG. 2 is a block diagram of a computer network system in accordance with an embodiment of the invention.

FIG. 2 is a block diagram depiction of one embodiment of a multi-processor computer system 200 of one embodiment of the invention. The multi-processor computer system 200 illustrated in FIG. 2 comprises application programs 215, descriptive resource allocator 220, operating system 225, CPUs 210A and 210B, memory 230, and input and output (I/O) devices 250A and 250B. In one embodiment of the invention, the system 200 uses a computer system architecture based on a multi-processor shared memory and is a Non-Uniform Memory Access (NUMA). The CPUs 210A and 210B are connected to communicate with other nodes that may connect to the system 200. The I/O devices 250A and 250B connect the CPUs 210A and 210B to devices outside computer system 200 for communicating information between the system 200 and the outside world.

The operating system 225 communicates with the application programs 215 via system call interfaces. In one embodiment of the invention, a descriptive memory allocation system may be implemented in the operating system 225.

In one embodiment of the invention, a system interface to the operating system 225 allows an application to describe how it will use memory 230 in a computer system 200. With this information, the operating system 225 is able to optimally allocate memory 230 for the applications 215. On NUMA machines, this results in the operating system 225 choosing the appropriate memory allocation policy for the specified memory given in the application's described behavior. This is in contrast to having the application specify the memory allocation policy directly as exists in the prior art.

Figure 3:
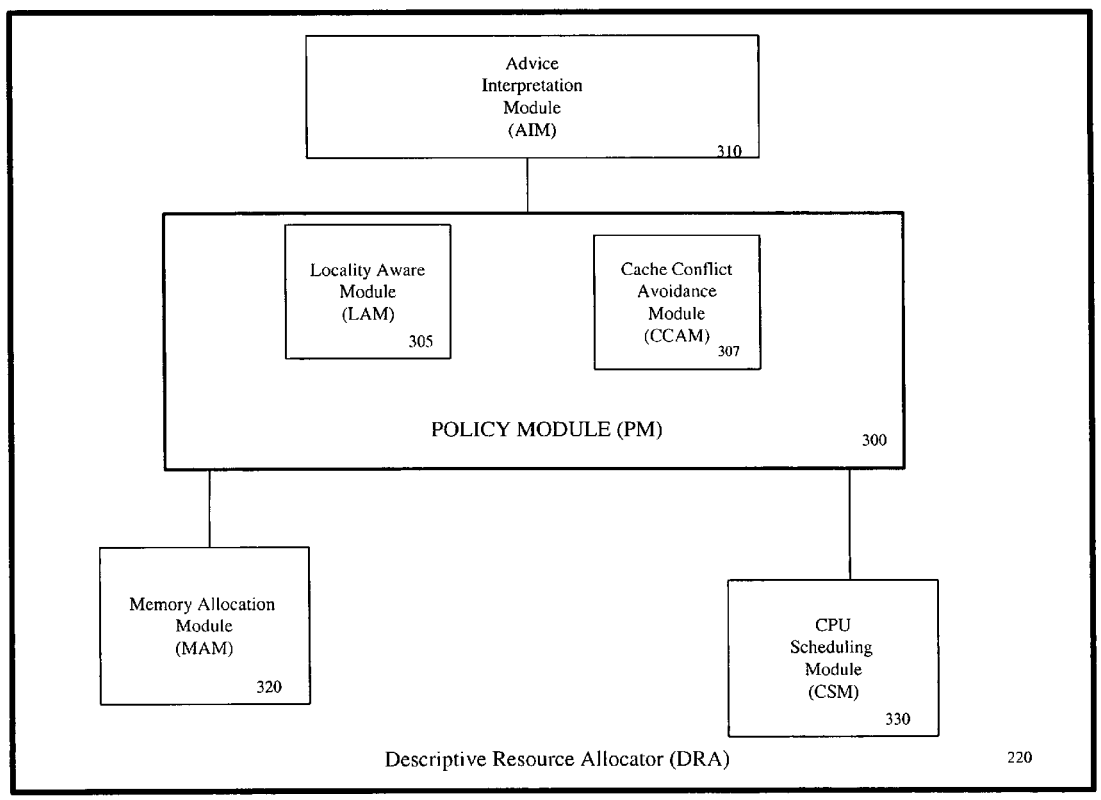
FIG. 3 is block diagram illustration of one embodiment of the internal architecture a descriptive memory allocator of an embodiment of the invention.

FIG. 3 is a block diagram of one embodiment of the internal architecture of the Descriptive Resource Allocator (DRA) 220 of the invention. As shown in FIG. 3, the DRA 220 comprises Policy Modules (PM) 300, Advice Interpretation Module (AIM) 310, Memory Allocation Module (MAM) 320 and CPU Scheduling Module (CSM) 330. In one embodiment of the invention, the policy module 300 comprises the Locality Aware Module (LAM) 305 and Cache Conflict Avoidance Module (CCAM) 307.

The Advice Interpretation Module (AIM) 310 receives advice on how a particular application intends to use memory and passes the advice to the appropriate policy module in the Policy Module (PM) 300 given the kind of computer system on which the application is running.

The Locality Aware Module (LAM) 305 determines, sets and helps to implement the memory allocation policies to improve locality by scheduling threads to run on certain CPUs, allocating memory nearby whenever possible, and balancing load across nodes at the same time to provide lowest latency. In one embodiment, the LAM 305 determines the appropriate memory allocation policy on NUMA machines to set for a given memory range to a particular application.

In one embodiment of the invention, the LAM 305 comprises three memory allocation policies that include a "next touch" memory policy, a random memory allocation policy and a default memory allocation policy. In one embodiment of the invention, the operating system uses the DRA 220 to interpret the descriptive advice provided by an application to set memory allocation policies to allocate a specified memory address range for the application.

The "next touch" memory allocation policy is invoked by the DRA 220 when the application specifies that the next thread to touch a specified address range will access to that particular range heavily. This allows the operating system to try to allocate memory and other resources for the specified range and the thread accordingly. In one embodiment on NUMA machines, the memory is allocated in the node for which the thread has affinity.

The random memory allocation policy is invoked by the DRA 220 when the application specifies that multiple processes or threads will access the specified address range heavily. This enables the operating system to try to allocate memory and other resources randomly to the specified range. In one embodiment of the present invention, the operating system allocates memory for the specified range from all the nodes in NUMA machine.

In a third memory allocation scheme, the default memory allocation policy is invoked by the DRA 220 when the application wants to set the expectation of how the specified address range will be accessed to the default. In one embodiment of the present invention, the default memory allocation policy for shared memory is the random memory allocation policy on NUMA machines. For private memory, the default allocation policy is the next touch policy.

Once the memory allocation policy for a requesting application is determined and set, the Memory Allocation Module (MAM) 320 sets the memory allocation policy given by the Policy Module and allocates memory according the given policy. The MAM 320 may further establish a mapping between a process's virtual address space and the desired object (e.g., physical memory in the present invention). In one embodiment of the invention, the MAM 320 is the virtual memory subsystem in the operating system. The CPU Scheduling Module (CSM) 330 schedules threads to run on CPUs. In one embodiment of the invention, this is the scheduling subsystem of the operating system.

Figure 4:
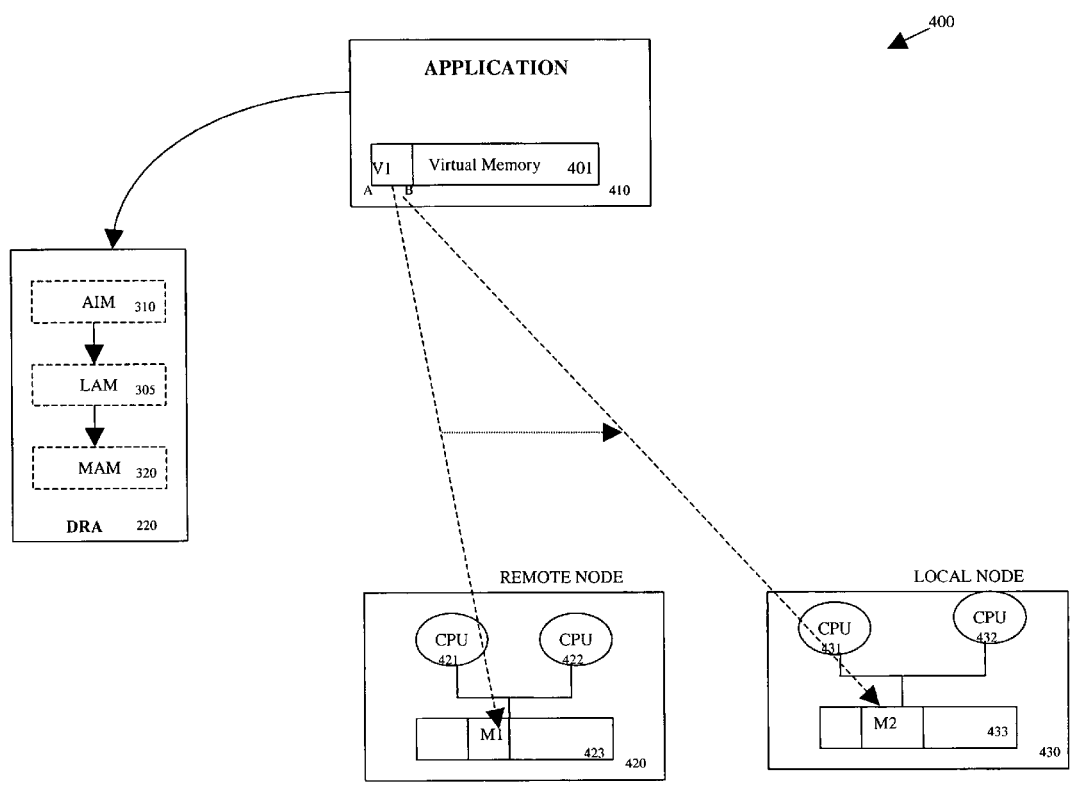
FIG. 4 is a block diagram illustration of an embodiment of a Non Uniform Memory access computer system environment implementation of an embodiment of the descriptive memory allocation allocator of the invention.

FIG. 4 is a block diagram illustration of an implementation of the next touch memory allocation policy of one embodiment of the descriptive resource allocator (DRA) 220 of the invention in a NUMA machine. As shown in FIG. 4, the descriptive resource allocation environment comprises a plurality of nodes 420 and 430, CPUs 421, 422, 431, and 432, physical memories 423 and 433 and DRA 220.

In the environment depicted in FIG. 4, the underlying computer operating system is locality aware (e.g., the operating system knows which CPU, memory, and other resources are close to each other). In the example illustrated in FIG. 4, the DRA 220 enables multiple applications (e.g., application 410) to perform efficiently on any supported computing platform. The DRA 220 allocates resources for an application to provide good performance given its described memory access behavior.

In the environment shown in FIG. 4, the application 410 has a portion of its virtual memory 401 (e.g., V1) from addresses "A" to "B" mapped to physical memory "M1" in memory 423. In the implementation illustrated in FIG. 4, the application 410 advises the DRA 220 that the next thread to touch virtual memory "V1" in range "A" to "B" will access it heavily. The AIM 310 receives this advice from the application 410 and determines that the application is running on a NUMA machine and passes the advice to the LAM 305.

The LAM 305 then determines that the next touch memory allocation policy should be set for virtual memory V1 in address range "A" to "B" and informs the MAM 320 to set the policy. The MAM 320 subsequently sets the next touch allocation policy and arranges for memory to be near the next thread to touch the specified memory range. When the next thread accesses virtual memory "V1", the MAM 320 migrates memory "M1" from the remote node 420 to memory "M2" in the local node 430 where the thread is running. The MAM 320 then establishes mapping from virtual "V1" in memory 401 to local memory "M2" in memory 433.

Figure 5:
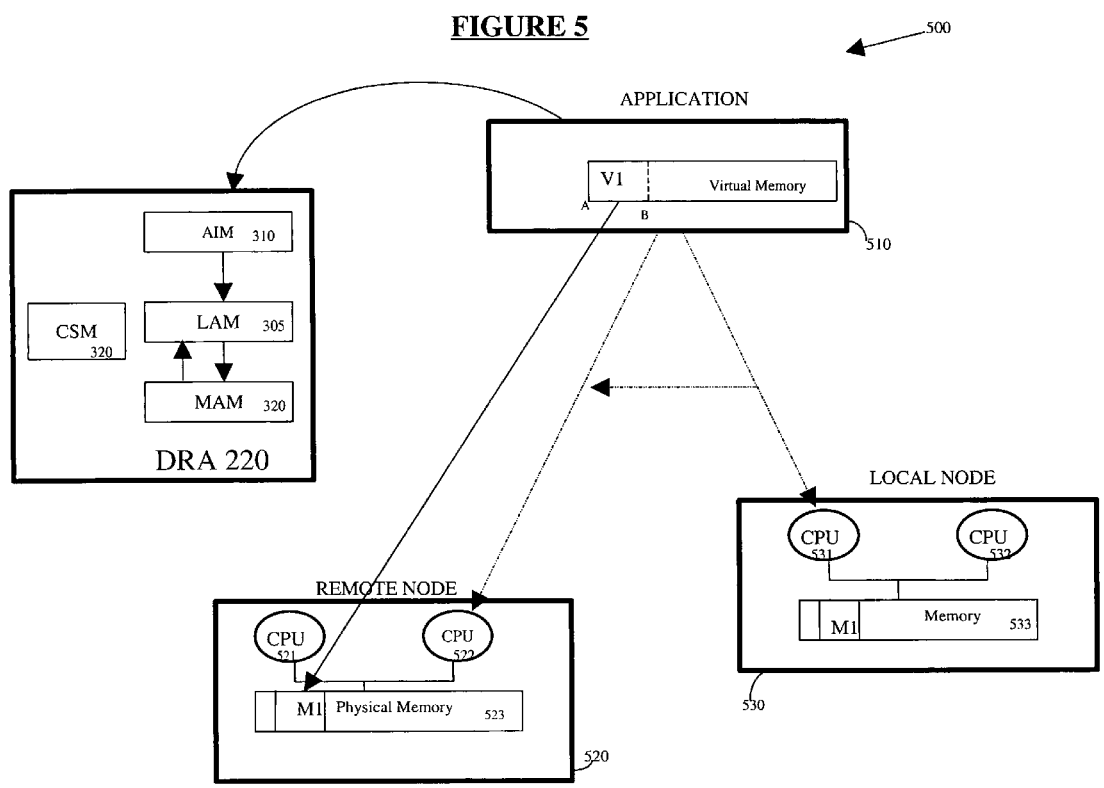
FIG. 5 is a block diagram illustration of one embodiment of memory the computer system environment of FIG. 4 with an embodiment of a memory lock operation of an embodiment of a NUMA machine of the invention.

FIG. 5 is a block diagram illustration of one embodiment of an exemplary memory allocation for a NUMA based computer system with a locked memory implementation of the invention. As shown in FIG. 5, the descriptive resource allocation environment 500 comprises a plurality of nodes 520 and 530, CPUs 521, 522, 531, and 532, physical memories 523 and 533 and DRA 220. In the environment 500 depicted in FIG. 5, the underlying computer operating system is locality aware (e.g., the operating system knows which CPU, memory, and other resources are close to each other). In the example illustrated in FIG. 5, the DRA 220 enables multiple applications (e.g., application 410) to perform efficiently without any changes in the underlying computing platform. In the example shown in FIG. 5, the application 510 has a portion of its virtual memory 501 (V1) from address "A" to "B" mapped to physical memory "M1" in memory 523. The application 510 advises the DRA 220 that the next thread to touch virtual memory "V1" in memory range "A" to "B" will access it heavily.

The AIM 310 receives this advice from the application 510 and determines that the application is running on a NUMA machine and passes the advice onto the LAM 305. The LAM 305 then determines that the next touch memory allocation policy should be set for virtual memory "V1" in address range "A" to "B" and informs the MAM 320 to set the policy. The MAM 320 subsequently sets the next touch allocation policy and arranges for memory to be near the next thread to touch the specified memory range.

When the next thread attempts to access the virtual memory "V1" in memory 501, the MAM 320 determines whether the memory "M1" in the remote node 520 is locked. If the remote memory "M1" is locked, the MAM 320 informs the LAM 305 to assign the thread to run on the remote node 520 whenever possible and the LAM 305 makes the thread have an affinity for the remote node 520. The CSM 330 then schedules the thread to run on the remote node 520.

Figure 6:
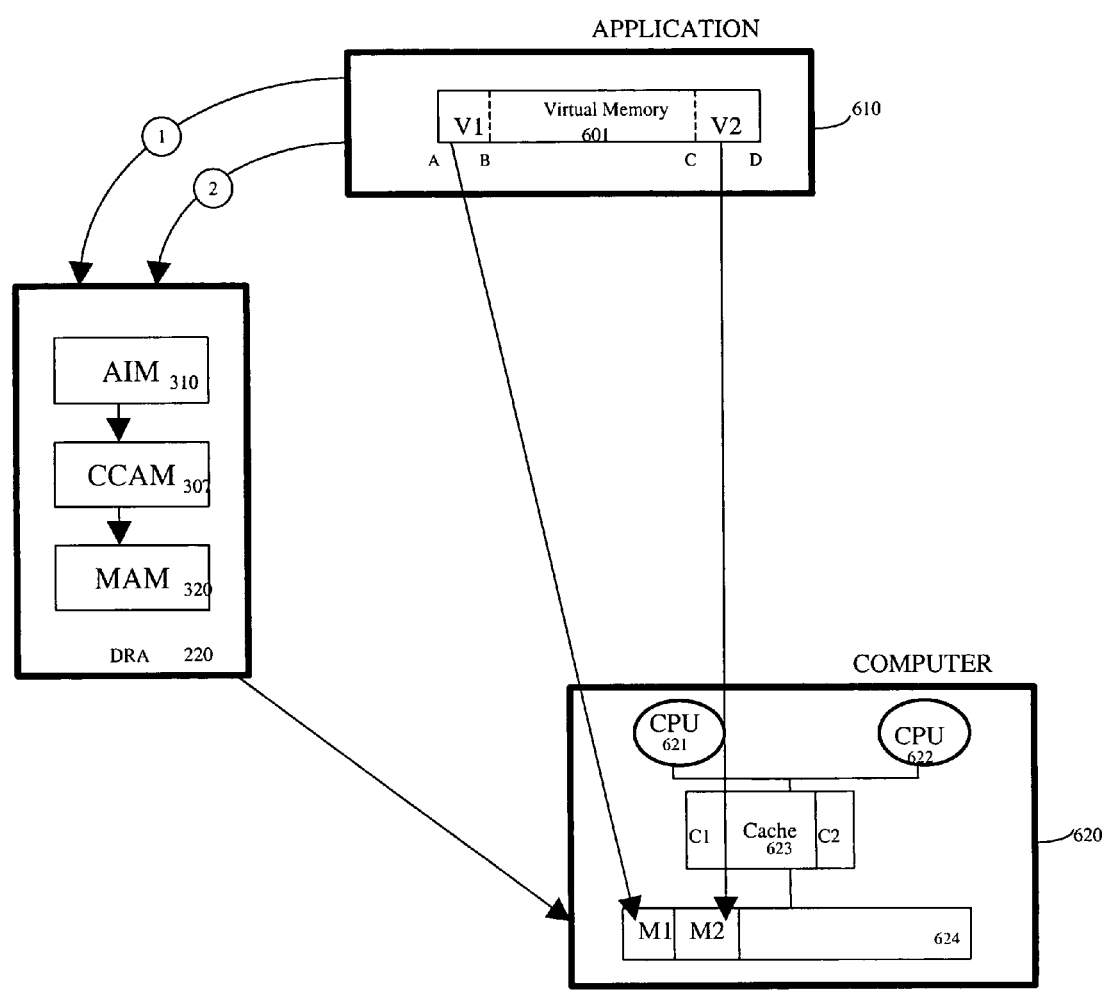
FIG. 6 is a block diagram illustration of one embodiment of memory allocation and mapping of an embodiment of a cache avoidance implementation in a of the invention.

FIG. 6 is a block diagram illustration of an embodiment of an implementation of a memory cache conflict avoidance of the present memory placement system for an exemplary computer system. In the illustration shown in FIG. 6, in a first stage (e.g., 1), the application 610 uses the DRA 220 to advice the operating system that the next thread in the application 610 to touch the specified virtual memory "V1" in memory 601 in range "C" to "D" will access it heavily. The AIM 310 receives this advice and determines whether cache conflict avoidance may be applied on the underlying computer system on which application 610 is running. The AIM 310 the passes the allocation advice to the CCAM 307. The CCAM 307 then determines that the cache conflict avoidance memory allocation policy should be set for virtual memory "V1" and informs the MAM 320 to set the cache conflict avoidance policy. The MAM 320 then sets the allocation policy to avoid conflicts in the cache 623 and allocates memory "M1" that gets cached in cache "C1".

Still referring to FIG. 6, in a second stage (e.g., 2), the application 610 further advises the DRA 220 that the next thread to touch the virtual memory "V2" in range "C" to "D" will access it heavily. The DRA 220 receives the advice and determines that cache conflict avoidance may be implemented on the underlying computer system in which the applications 610 is running. The DRA 220 then passes the advice provided by the applications 610 to the CCAM 307. The CCAM 307 then determines that cache conflict avoidance memory allocation policy should be set for virtual memory "V2" and informs the MAM 320 to set the policy. The MAM 320 sets the cache conflict avoidance policy and tries to allocate memory "M2" to get different cache color "C2" to avoid cache conflicts between heavily accessed virtual memory "V1" and "V2" as advised by the application 610.

Figure 7:
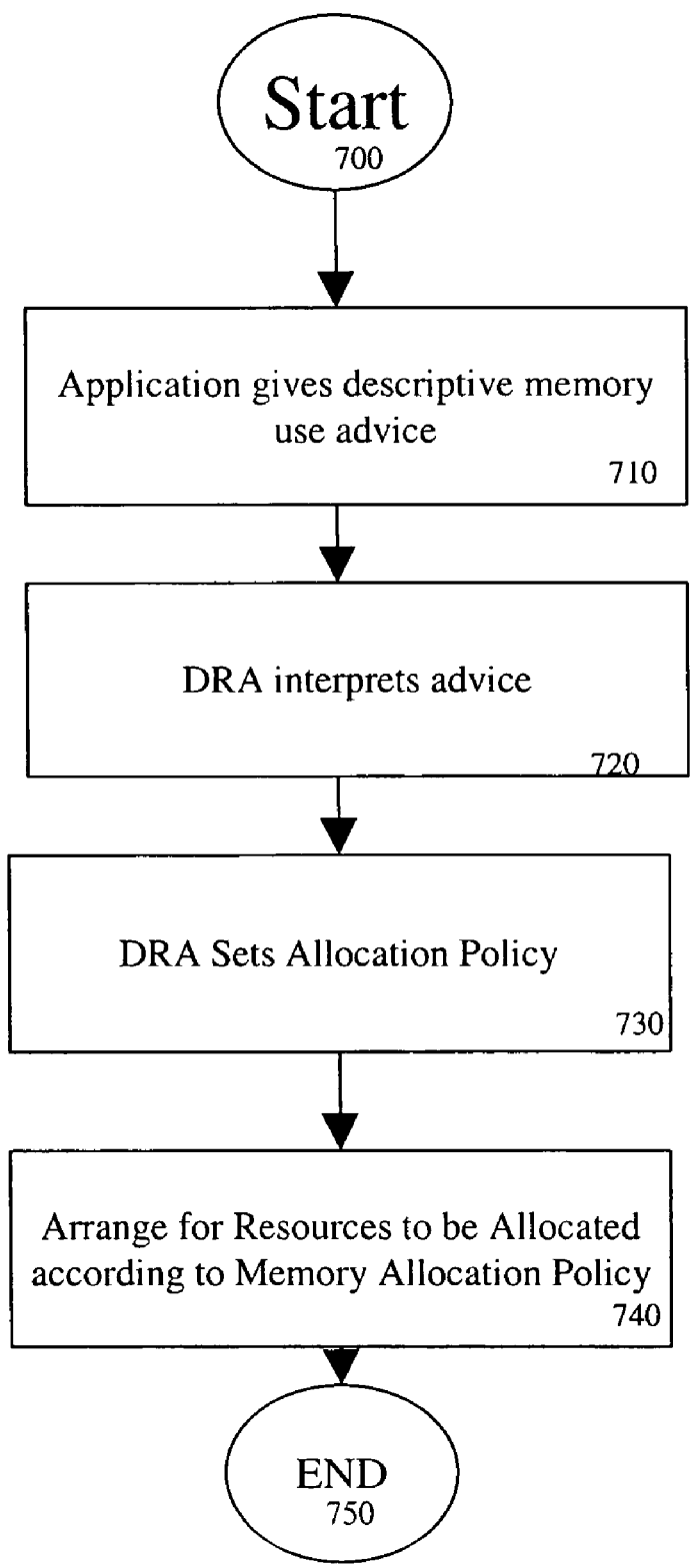
FIG. 7 is a flow diagram of one embodiment of the descriptive memory allocation system of the invention.

FIG. 7 is a computer implemented flow diagram illustration of one embodiment of the descriptive memory allocation system of the invention.

At step 710, the application gives descriptive advice to the DRA 220 specifying that the given memory will be heavily accessed and whether it will be accessed by one or many threads.

At step 720, the DRA 220 interprets the advice provided by the application and passes the advice to the appropriate policy module. The policy module determines the appropriate allocation policy and sets the policy at step 730. The DRA 220 then arranges for resources to be allocated according the policy at step 740.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A method of descriptively specifying memory placement in a shared memory computer system among a plurality of application programs, said method, comprising:

receiving descriptive information from each of said plurality of application programs, said descriptive information comprising thread information for said plurality of application programs and defining operating characteristics for said plurality of application programs; and generating a memory allocation policy by an operating system in said computer system corresponding to said descriptive information provided by said plurality of application programs.

2. The method of claim 1, wherein said memory allocation policy comprises a first allocation policy set by said operating system such that a next thread, in said plurality of application programs, that touches a specified address range in main memory will access said specified address range most heavily.

3. The method of claim 2, wherein said operating system further allocates said specified address range to said next thread.

4. The method of claim 3, wherein said memory allocation policy further comprises a second allocation policy set by said operating system to enable access to said specified address range to be randomly accessed by a plurality of processes in said shared memory computer system.

5. The method of claim 4, wherein said operating system allocates said main memory and other resources in said computer system to said specified address range.

6. The method of claim 5, wherein said memory allocation policy further comprises a third allocation policy set by said operating system to a default memory allocation policy of said operating system for determining how the specified memory address range is allocated.

7. The method of claim 6, wherein said memory allocation policy specified by said operating system includes the following:
- to allocate physical memory on a node from which a first reference is made;
- to randomly choose said node to allocate physical memory; and
- to allocate physical memory based on said default allocation policy of an underlying operating system kernel.

8. The method of claim 1, wherein said descriptive information comprises memory requirements for said plurality of application programs.

9. A shared memory computer system, comprising:
a memory allocation unit for descriptively and dynamically allocating physical memory,
   wherein said memory allocation unit comprises:
      a memory use description interpretation module for interpreting application specific memory use advice from application programs and determining an optimal way to allocate memory to said application programs, and
      a first memory allocation flag set by an operating system to allocate memory to said application programs for heavy access in a specified address range in said memory;
   the operating system for setting a memory allocation policy for said application programs dynamically accessing said physical memory; and
   an operating system kernel for controlling how said operating system sets said memory allocation policy for said application programs.

10. The shared memory computer system of claim 9, wherein said memory allocation unit comprises a memory use description interpretation module for interpreting application specific memory use advice from said application programs and determining how to allocate resources to said application programs in response to said memory use advice.

11. The shared memory computer system of claim 10, wherein said application programs are platform independent.

12. The shared memory computer system of claim 9, wherein said memory allocation unit further comprises a second memory allocation flag set by said operating system to allocate memory to said application programs for random access to said specified address range in said memory.

13. The shared memory computer system of claim 12, wherein said memory allocation unit further comprises a third memory allocation flag set by said operating system to allocate memory to said application programs in a default allocation process.

14. The shared memory computer system of claim 13, wherein said memory allocation unit further comprises a memory mapping unit for mapping address ranges specified by said operating system for said application programs to physical address space in said memory.

15. The shared memory computer system of claim 14, wherein said memory allocation unit further comprises a threading unit for determining the number of threads each of said applications programs possesses during a memory access to said memory.

16. The shared memory computer system of claim 15, wherein said memory allocation unit further comprises a cache conflict avoidance unit for deciding whether cache conflict avoidance should be set for a given range in said memory.

* * * * *